United States Patent [19]

Fultz

[11] Patent Number: 5,718,933

[45] Date of Patent: *Feb. 17, 1998

[54] CONTAINER FOR STORING A FOOD PRODUCT AND A SAUCE THEREFOR

[75] Inventor: Jerry Fultz, Lancaster, Pa.

[73] Assignee: BC-USA, Inc., New Holland, Pa.

[*] Notice: The term of this patent shall not extend beyond the expiration date of Pat. No. 5,529,794.

[21] Appl. No.: 614,622

[22] Filed: Mar. 13, 1996

Related U.S. Application Data

[63] Continuation-in-part of Ser. No. 228,701, Apr. 18, 1994, Pat. No. 5,529,794.

[51] Int. Cl.[6] .................................................. B65D 85/60
[52] U.S. Cl. .......................... 426/115; 426/120; 426/123; 206/221; 206/568; 220/671
[58] Field of Search ............................ 426/115, 119, 426/120, 123, 392; 206/221, 568, 824; 220/671

[56] References Cited

U.S. PATENT DOCUMENTS

| 1,706,335 | 3/1929 | Toch | 206/221 X |
|---|---|---|---|
| 2,005,245 | 6/1935 | Stover | 206/56 |
| 2,689,566 | 9/1954 | Lockhart | 128/233 |
| 3,314,563 | 4/1967 | Mounier | 215/6 |
| 3,321,097 | 5/1967 | Solowey | 215/6 |
| 3,464,414 | 9/1969 | Sponnoble | 128/272 |
| 3,779,371 | 12/1973 | Rovinski | 206/47 |
| 3,832,950 | 9/1974 | Hurst | 102/24 |
| 5,209,348 | 5/1993 | Schafer, III | 206/222 |
| 5,529,794 | 6/1996 | Fultz | 426/115 |

OTHER PUBLICATIONS

Plastic cup known as "Kozy Shack Cup" —measures 2 1/4 inches high and includes a 1/4-inch plastic tab on its top surface.

*Primary Examiner*—Milton Cano
*Attorney, Agent, or Firm*—Vickers Daniels & Young

[57] ABSTRACT

A container for storing a food product and a sauce therefor having a lower section for containing the food product and an upper section for containing the sauce. The container includes a tab which can be pulled to allow air into the upper section to release the sauce from the upper section and the food product from the container.

29 Claims, 10 Drawing Sheets

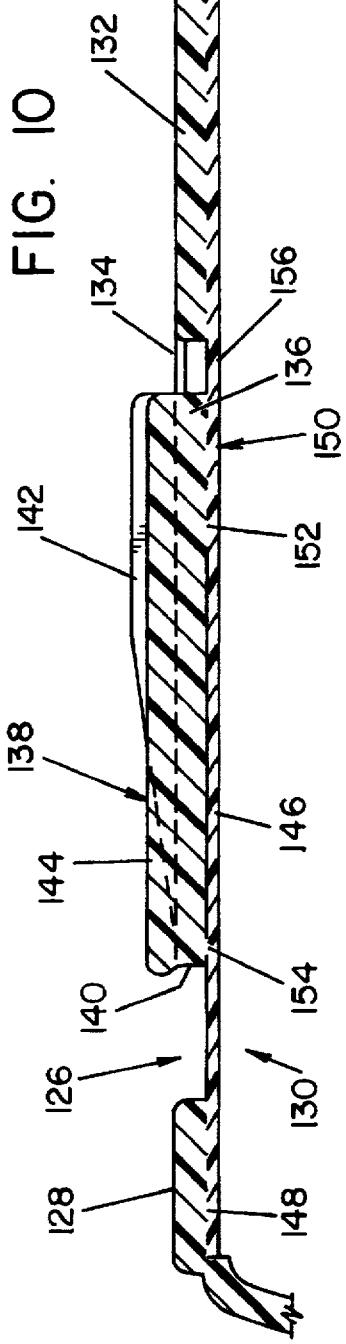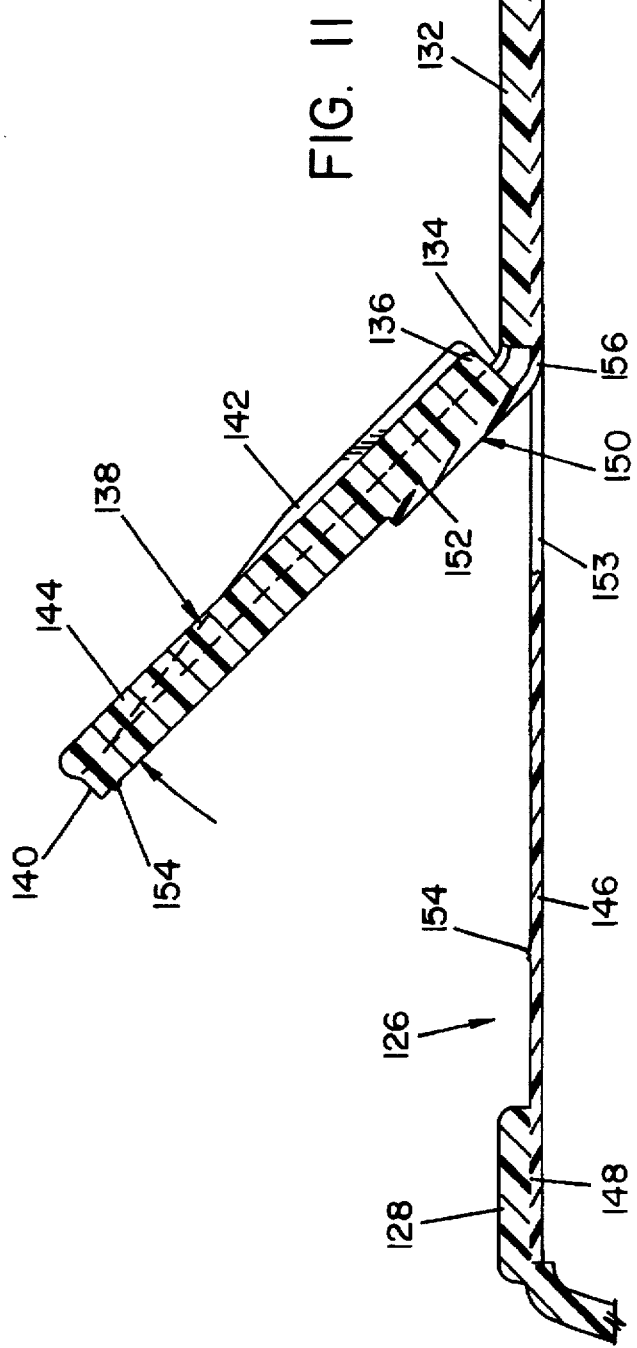

CONTAINER FOR STORING A FOOD PRODUCT AND A SAUCE THEREFOR

This application is a continuation in part of application Ser. No. 228,701 filed Apr. 18, 1994 now U.S. Pat. No. 5,529,794.

BACKGROUND

The present invention is directed toward containers for food products, and, more specifically, toward containers for storing a food product and a sauce therefor.

It is often desirable to pour a sauce or other topping over a food product prior to eating said food product. These sauces are normally sold separately from the product to be topped and are applied just prior to serving the product. For example, ice cream and custard-type desserts may be eaten with toppings such as chocolate sauce or sauces coming in a variety of fruit and non-fruit flavors. These sauces come in cans or bottles and may be poured or spooned onto the dessert prior to eating. Such sauces are generally sold in containers which hold numerous servings of sauce since a typical serving of sauce is often a teaspoon to several tablespoons. Thus, an open container of sauce usually must be kept and stored long after the product to be topped has been consumed. Furthermore, if different flavors of sauce are desired, several separate containers of sauce must be opened and stored. These sauces may lose their freshness during storage and be less appetizing when used a second or subsequent time.

Further problems are caused by transferring a sauce to the product to be topped. Generally, a separate spoon must be used to transfer sauce from its container. Since sauces are often viscous, sauce can be wasted on the spoon or other serving implement. Sauces can also be poured from their containers but this can be quite messy. When the presentation of the product is important, it is desirable to serve a product with sauce carefully placed on the product and not running off of the plate or onto a tablecloth or on the server's hands. It takes considerable care to avoid these problems when serving a sauce out of a separate container.

Sauces may be sold in single portion containers but this generally increases the price thereof as a greater amount of packaging must be employed. One would still generally have to buy a box of individual containers, rather than just one or two containers. Finally, the large ratio of package interior surface area to sauce volume means that it will be difficult to remove all of a sauce from a single serving package.

Attempts have been made to overcome the above problems by packaging products such as ice cream with a sauce already applied. However, it is difficult to keep the sauce from flowing to one section of the container if the product is not frozen. If the product and sauce are frozen, the product may be served with a sauce frozen to it which detracts from the appearance and palatability of the product when served. Known methods for packaging food sources often have one or more of these failings.

SUMMARY OF THE INVENTION

The present invention overcomes the above problems, and others, and provides a container which is simple to use and construct and which holds a sauce in one portion of the container and a product in another portion of the container until the product is to be served.

In accordance with a principal feature of the invention, a container is provided which has a lower section for containing a food product and an upper section for holding a sauce which will be allowed to flow over the food product just prior to serving. The top portion of the container engages the food product in the lower section in a manner such that the sauce is retained within the upper compartment during shipment and storage. The upper section can be opened or broken to allow air into the container to disengage the upper section from the food product in the lower section so that the sauce flows out of the upper section and over the top and sides of the food product when the product is served. This packaging concept allows a sauce to be applied neatly to a dessert in a decorative manner each time a product is served. Each container contains one serving of sauce so there are no half-empty canisters to store. Sauce is dispensed directly from each container so there is no need for separate utensils. The appearance of each dessert is enhanced while the mess is diminished by using the subject package.

In accordance with a more specific feature of the invention, the upper section comprises a side wall having a bottom edge. The bottom edge of the side wall presses down against the top of the food product to prevent the sauce from leaving the upper portion. Alternately, the bottom edge may extend beneath the surface of the food product in order to form a better seal.

It is therefore the principal object of the present invention to provide a container for storing a food product and a sauce to be served with that food product.

It is another object of the invention to provide a container which retains a sauce in one section of the container and a food product in another section of the container.

It is yet another object of the invention to provide a container for storing a food product and a sauce and which container may be manipulated to allow the sauce to flow over the food product when the product is being removed from the container.

It is another object of the present invention to provide a container with a mechanism for allowing air into one section of the container to facilitate the removal of the food product therefrom.

It is a further object of the invention to provide a container which allows a sauce to be applied to a food product without the use of a separate serving implement for the sauce.

It is still a further object of the invention to provide a container which allows a predetermined amount of sauce to be applied neatly and consistently to a predetermined portion of a food product.

It is yet a further object of the invention to provide a container which causes a sauce contained in said container to be evenly applied to a food product in an aesthetically, pleasing manner.

BRIEF DESCRIPTION OF THE DRAWINGS

These and other objects of the invention will become apparent from the following detailed description of a preferred embodiment thereof and the accompanying drawings of which:

FIG. 10 is an elevational view in cross-section of the opening mechanisms of the container shown in FIG. 8 showing the mechanisms prior to opening; and FIG. 11 is an elevational view in cross-section showing the opening mechanism of FIG. 10 after opening.

PREFERRED EMBODIMENT

Figure 1:
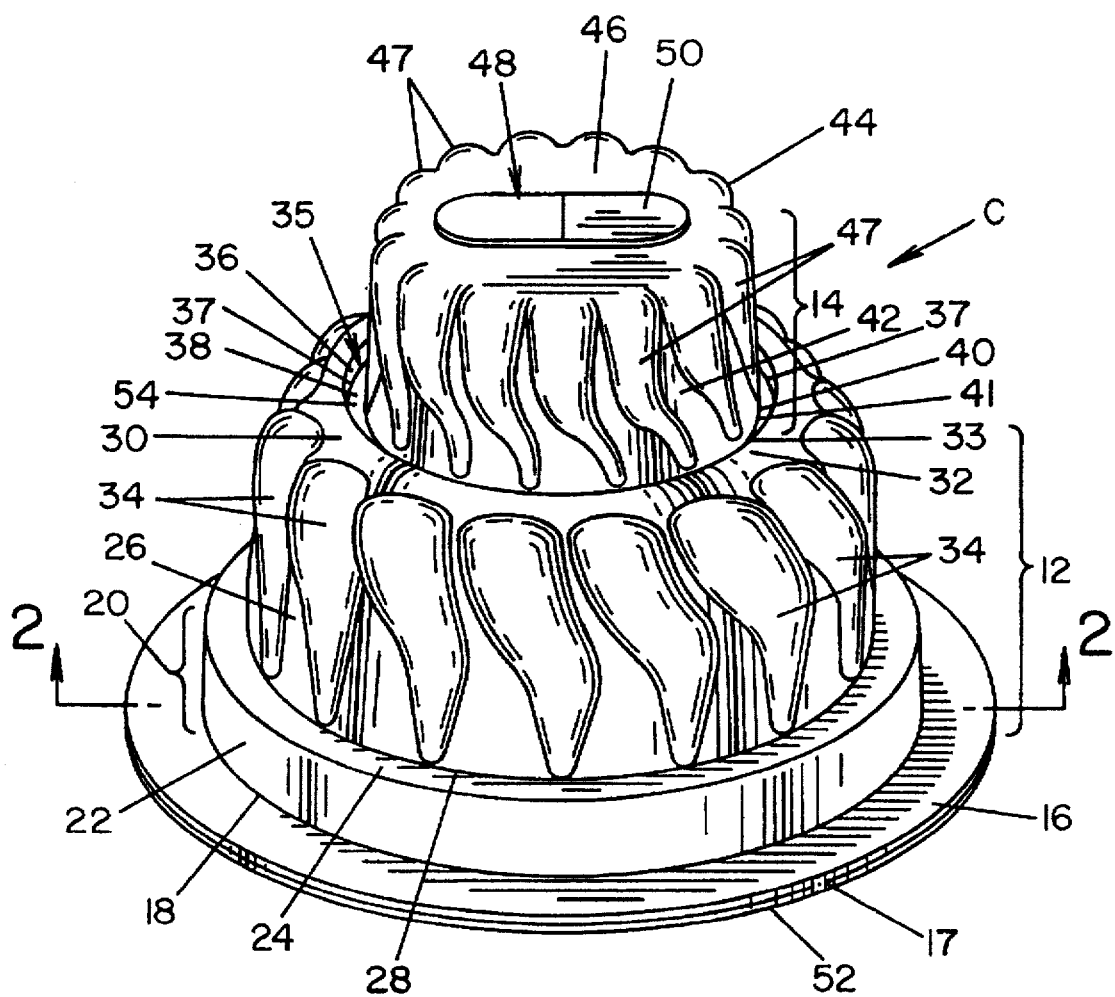
FIG. 1 is a perspective view of a food container in accordance with the present invention showing the container parts in a stored position.
Figure 2:
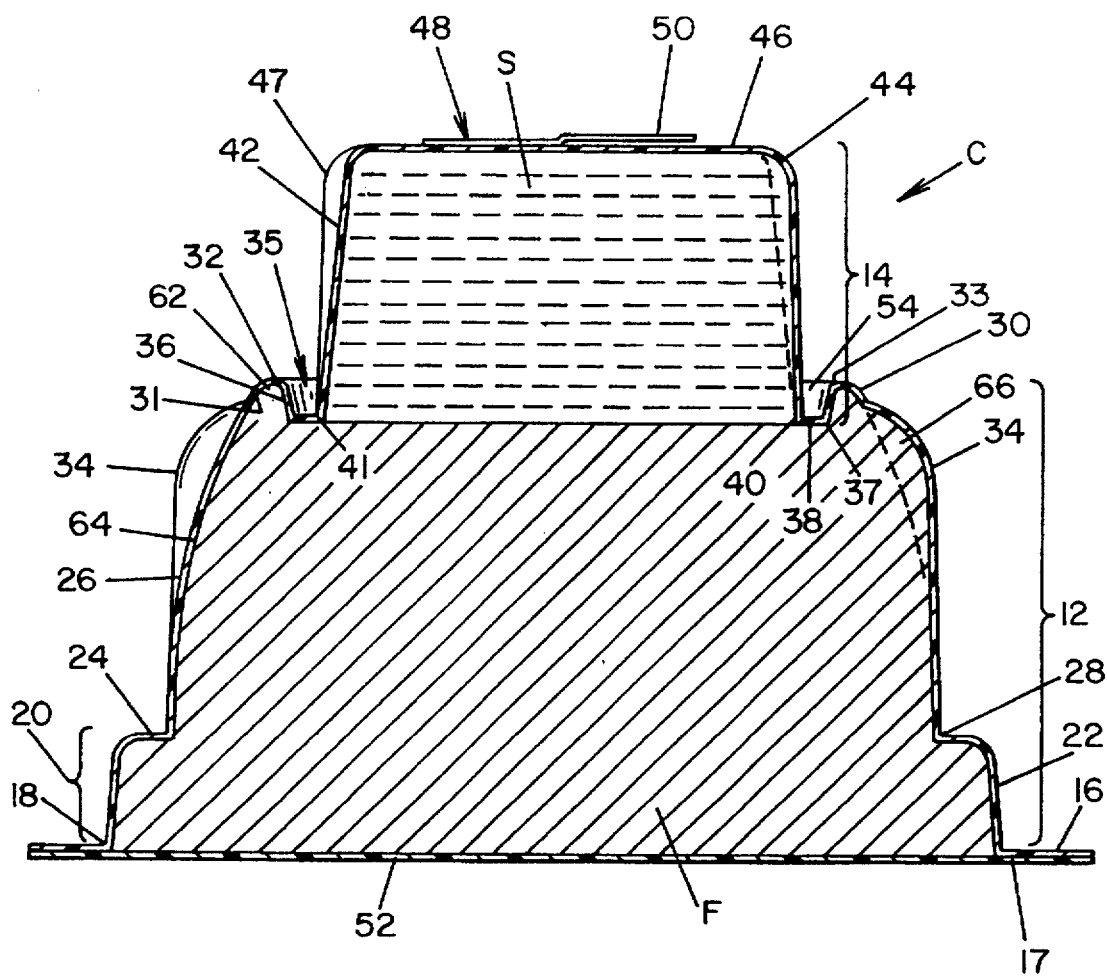
FIG. 2 is an elevational view in cross section of the container shown in FIG. 1 taken along line 2—2 in FIG. 1.

Referring now to the drawings where the showings are for the purpose of illustrating a preferred embodiment of the invention only and not for purposes of limiting same, in FIGS. 1 and 2 there is shown a container C for food product F and sauce S. Container C is preferably formed from a unitary piece of molded plastic such as polypropylene, for example, and comprises an upper portion 14 and a lower portion 12.

Food product F is contained in lower portion 12. Food product F may be any solid foodstuff, but in the preferred embodiment, product F is a gelatin or custard-type material which can be placed in lower section 12 in a liquid state and which will solidify and conform to the shape of lower portion 12. Sauce S is contained in upper portion 14. Sauce S is comprised of a liquid for topping food product F prior to serving said product. Sauce S may be of any viscosity, but it is preferred to use a sauce which is sufficiently viscous that it adheres to some degree to side 64 of product F when allowed to flow over product F.

Lower portion 12 comprises an annular lip 16 which extends radially outwardly from the bottom edge 18 of lower portion 12, stepped side wall portion 20 having a riser 22 and a horizontal wall portion 24, a side wall portion 26 extending upwardly from wall portion 24 and having a bottom edge 28 and a top edge 30, and a horizontal top wall 32 extending inwardly from edge 30 and having an inner edge 33. Wall portion 26 includes cavities 34 which affect the shape of food product F and the flow of the sauce as will be described hereinafter.

Upper portion 14 comprises a vertical sidewall 42 having a bottom edge 40 and a top edge 44, and a top wall 46 at top edge 44. Side wall 42 includes cavities 47 which affect the manner in which sauce S flows from upper portion 14 when food product F is served, and also make container C easier to grip. A tab 48 is fastened to top 46 by means of a suitable adhesive (not shown). Tab 48 includes an unattached portion 50 which may be grasped and pulled for reasons described hereinafter.

Figure 3:
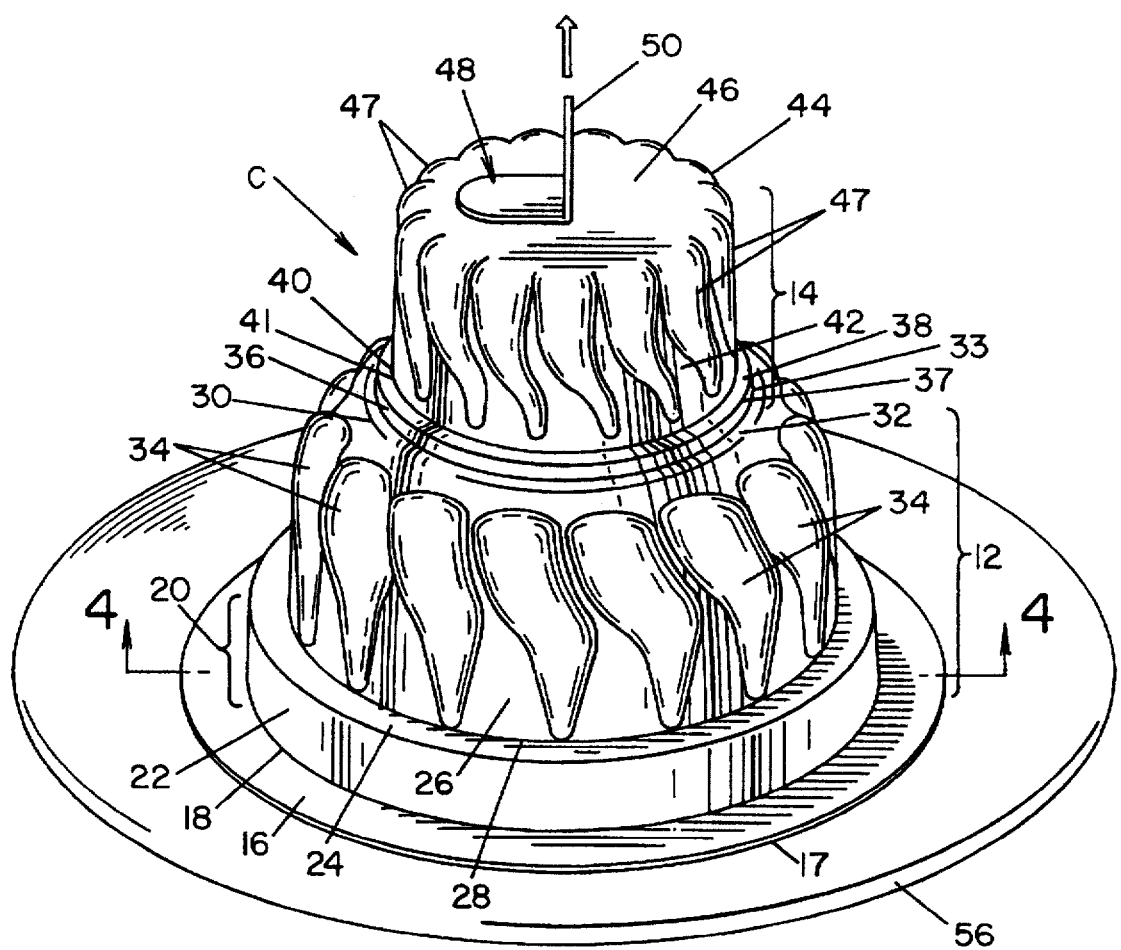
FIG. 3 is a perspective view of the container shown in FIG. 1 and showing the container parts in the use position.

Upper portion 14 is connected to lower portion 12 by a flexible connection 35. Flexible connection 35 is comprised of an annular vertical wall 36 and an annular horizontal wall 38 connected to wall 36 at junction 37. Wall 36 of flexible connection 35 is joined to top wall 32 of lower portion 12 at junction 33, and wall 38 of the flexible connection is joined to bottom edge 40 of vertical sidewall 42 of upper portion 14 at junction 41. In a first position of the lower and upper parts of container C, shown in FIGS. 1 and 2, junction 37 is located at a lower level than the top wall 32 such that a channel 54 is formed between wall 36 and sidewall 42. This is the configuration in which the container C is shipped and stored. In a second position or use position shown in FIGS. 3–4, upper portion 14 is elevated from the first position whereby walls 36 and 38 provide an annular recess 58 interiorly between the lower and upper portions of the container. The process of transforming the parts of container C from the first position to the second position thereof will be described hereinafter.

To fill container C, container C is inverted so that portion 14 is beneath portion 12. Sauce S is poured into portion 14 until it reaches the level of edge 40. Food product F is then poured into portion 12 so that it fills the region defined by side wall portion 26, stepped side wall portion 20, and top wall 32 including the shoulder region 31 defined by side wall portion 26, top wall 32 and wall 36. This forms a seal between wall 38 and food product F which confines sauce S within upper portion 14. Finally, container C is provided with a closure 52 suitably fastened to lip 16 to hermetically seal product F and sauce S within container C. Closure 52 may be of any suitable form and, in the embodiment shown, comprises a sheet of suitable material such as metal foil or plastic, bonded to bottom 17 of lip 16 by heat sealing or by the use of adhesives or other methods which are well known in the art. Because sauce S and product F are denser than air, the above-described filling process forces substantially all air out of portion 14 and shoulder region 31. After some period of time which depends on the nature of food product F, product F solidifies or congeals. At this point, container C can be returned to its proper orientation with portion 14 above portion 12. Bottom edge 40 sealingly engages food product F and, therefore, there are no gaps between product F and flexible connection 35, whereby sauce S is retained within the region defined by vertical sidewall 42 and the corresponding portion of the top surface of product F.

Figure 4:
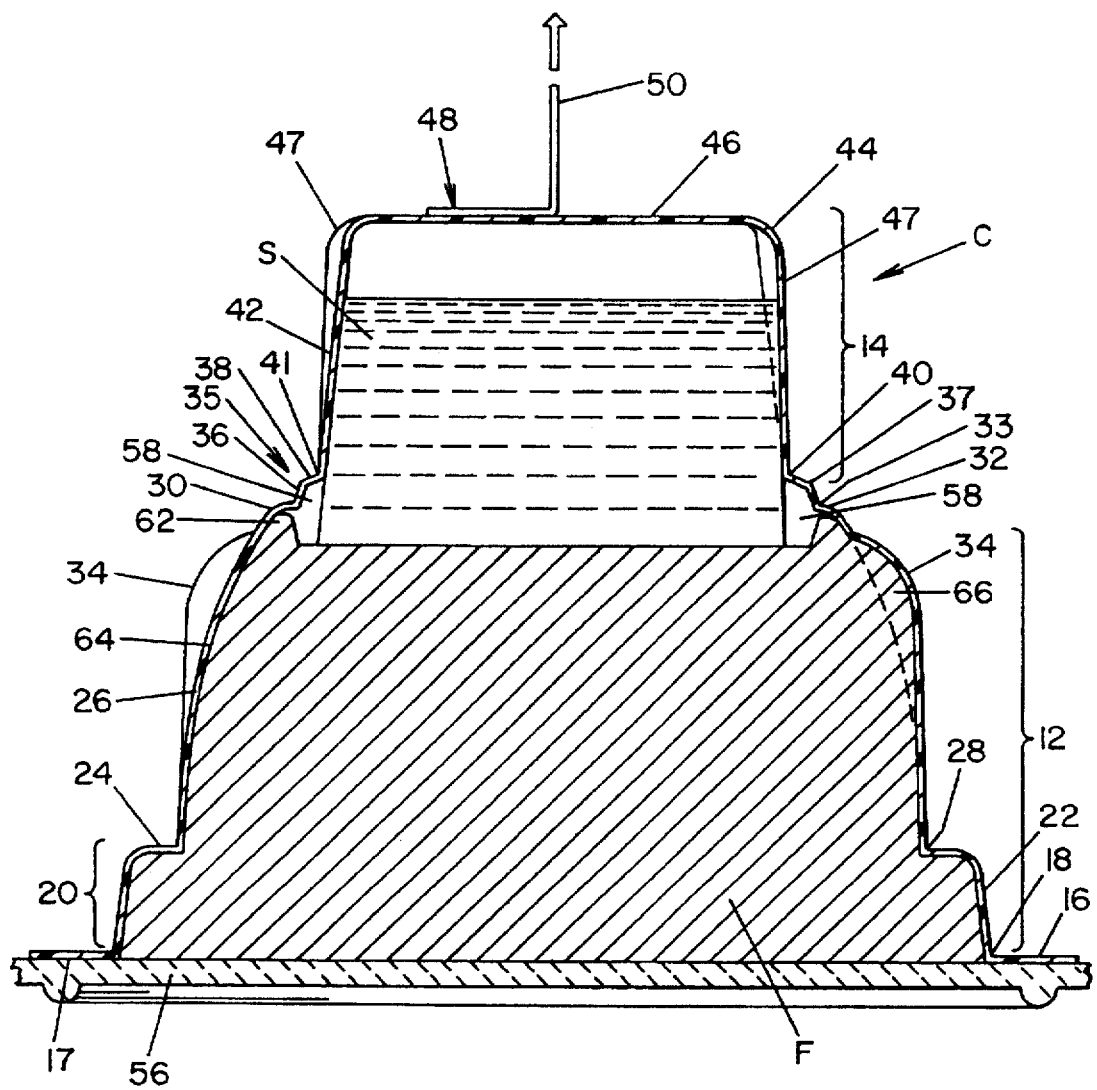
FIG. 4 is an elevational view in cross section of the container shown in FIG. 3 taken along line 4—4.
Figure 5:
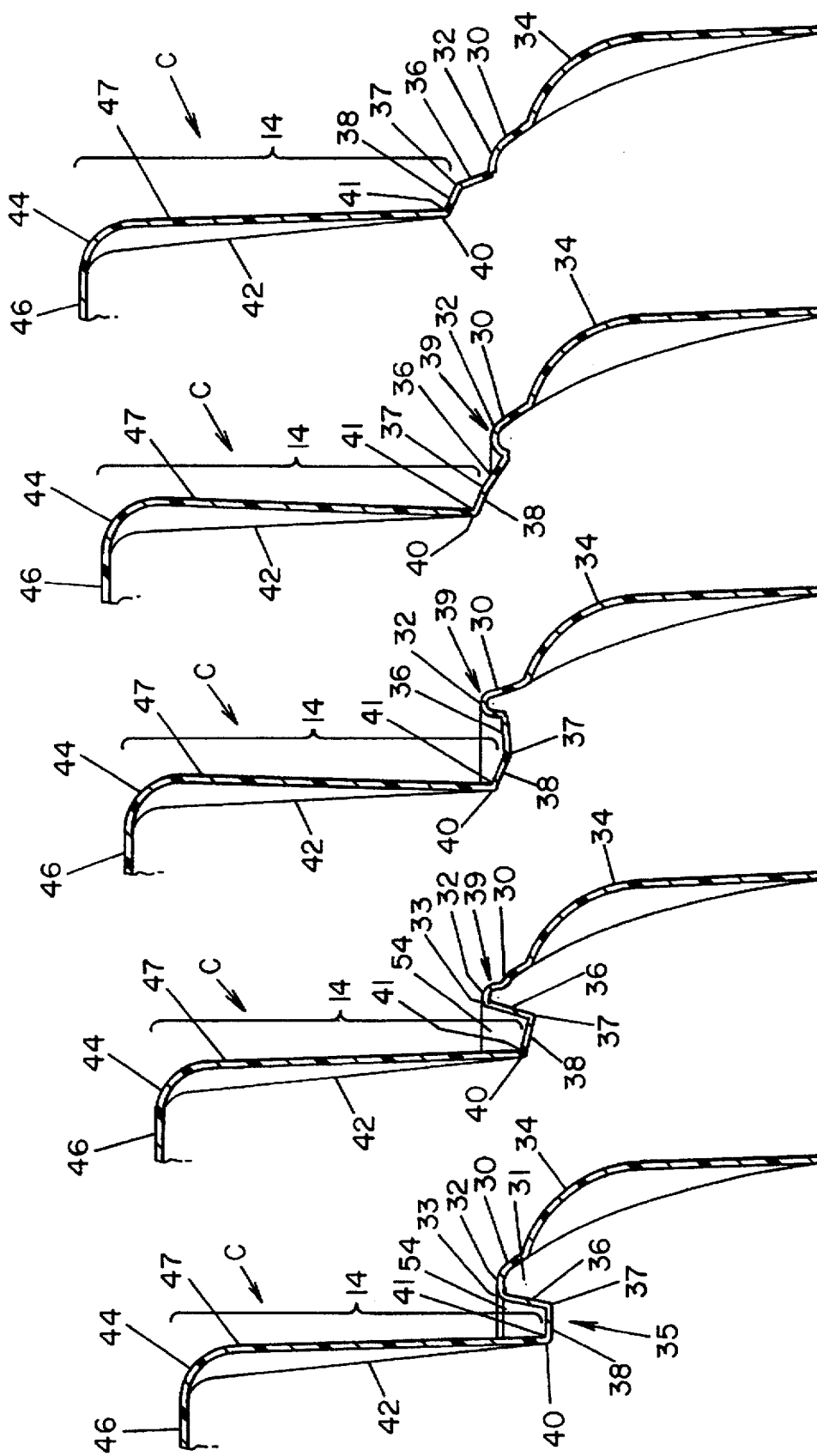
FIGS. 5a–e are schematic elevational views showing the transformation of the flexible connection between the container portions from the position shown in FIG. 2 to the position shown in FIG. 4.
Figure 6:
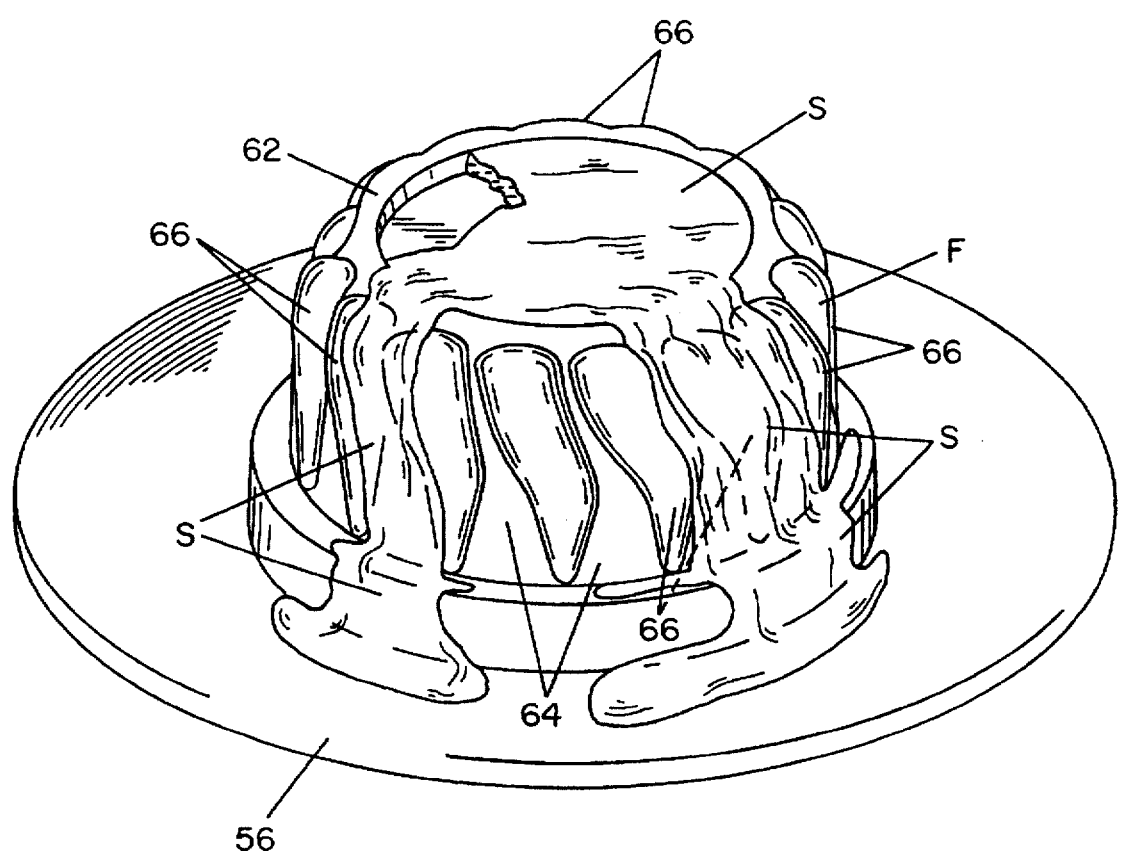
FIG. 6 is a perspective view of the food product contained in the container in FIG. 1 after said container has been removed.

When a consumer desires to dispense the food product F, the container C is held in one hand with closure 52 facing up. Closure 52 is peeled off of bottom 17 of lip 16 to expose food product F. Container C is then inverted onto a plate 56, or the like, so that container C rests on bottom 17 of lip 16. The consumer then holds top wall 32 of the lower portion 12 with one hand while grasping sidewall 42 or the free end 50 of tab 48 and pulling upper portion 14 straight up by tab 48 or wall 42. This displaces upper portion 14 from the first to the second position thereof, and the transformation of flexible connection 35 during such displacement is shown in FIGS. 5a–5e. In this respect, as connecting wall 38 begins to rise, drawn by sidewall 42, wall 36 deforms, junction 33 rises slightly and a ripple 39 forms adjacent junction 33 as shown in FIG. 5b. The portion of wall 36 adjacent junction 33 is thereby drawn to a position above top wall 32. As upper portion 14 continues to be drawn upwardly from lower portion 12, ripple 39 grows and when junction 37 is approximately even with junction 33 as shown in FIG. 5c, ripple 39 is at its largest and wall 36 has been folded approximately in half. As upper portion 14 is further drawn upwardly from portion 12 as shown in FIG. 5d, ripple 39 gradually disappears until wall 36 is left extending above wall 32 as shown in FIG. 5e and FIG. 4. The material from which container C, including wall 36 and wall 38 is made, is sufficiently flexible at least in the area of flexible connector 35 to allow container C to be so transformed.

When upper section 14 is pulled away from lower section 12 the volume of container C is increased by the volume of void 58 which is formed during this transformation. Pulling upper section 14 away from lower section 12 tends to draw air between wall 26 and product F and into void 58. Air tends to flow into void 58 due to the low pressure created in void 58 when said void is created. Drawing air into container C in this manner also helps to free product F from sidewall 26 of container C.

As container C is lifted from food product F, a portion of sauce S remains on top of the food and the remainder flows over the top wall 62 of food F and down the food sidewall 64. Sauce S is guided by ridges 66, formed by that portion of food F which was contained within cavities 34 in side wall 26. Furthermore, cavities 47 in side wall 42 retain a small portion of sauce S causing the sauce to drip from upper portion 14 onto ridges 66. The orientation of cavities 47 and ridges 66 insures that sauce S flows over product F in an aesthetically pleasing manner.

Figure 7:
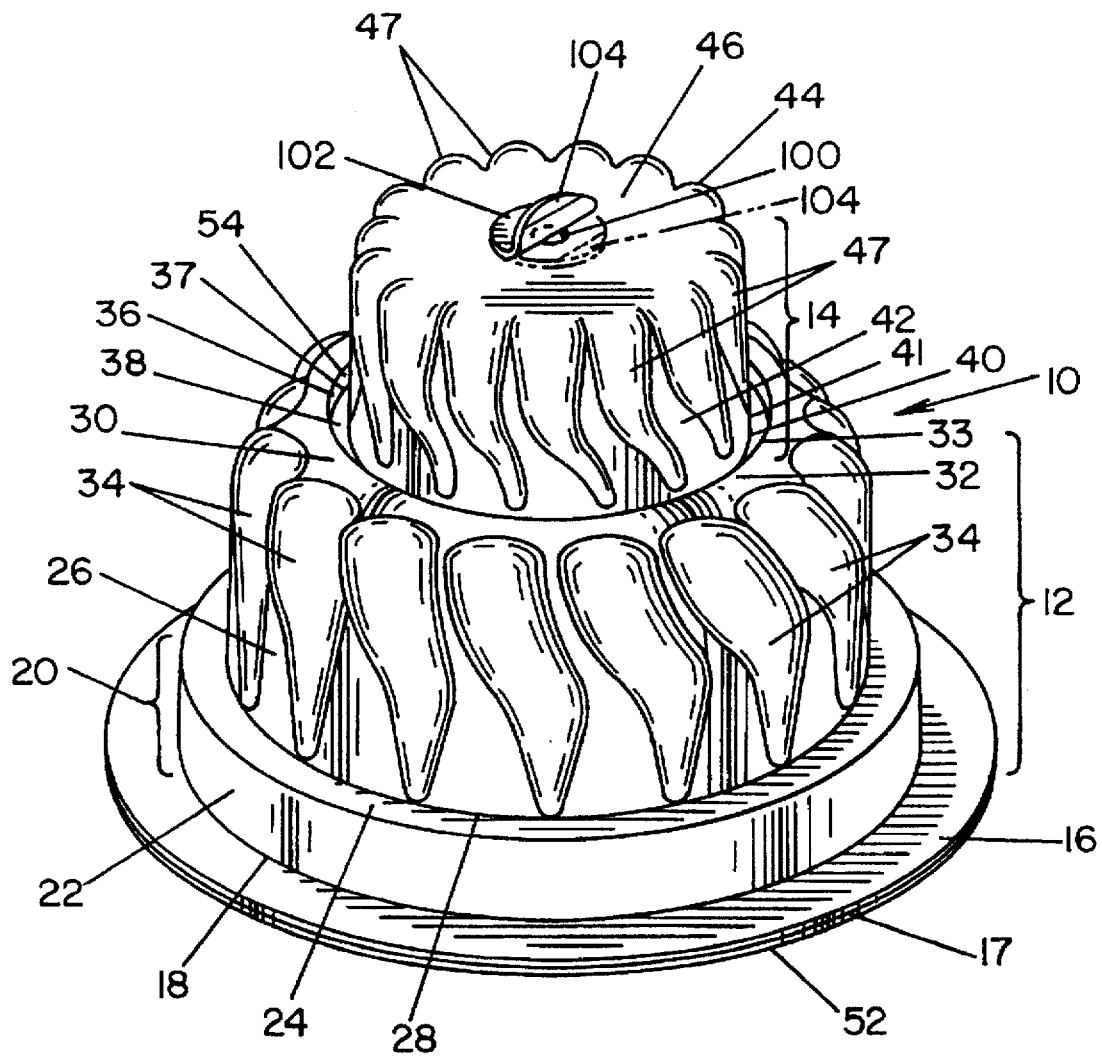
FIG. 7 is a perspective view of a second embodiment of the food container of the present invention.
Figure 8:
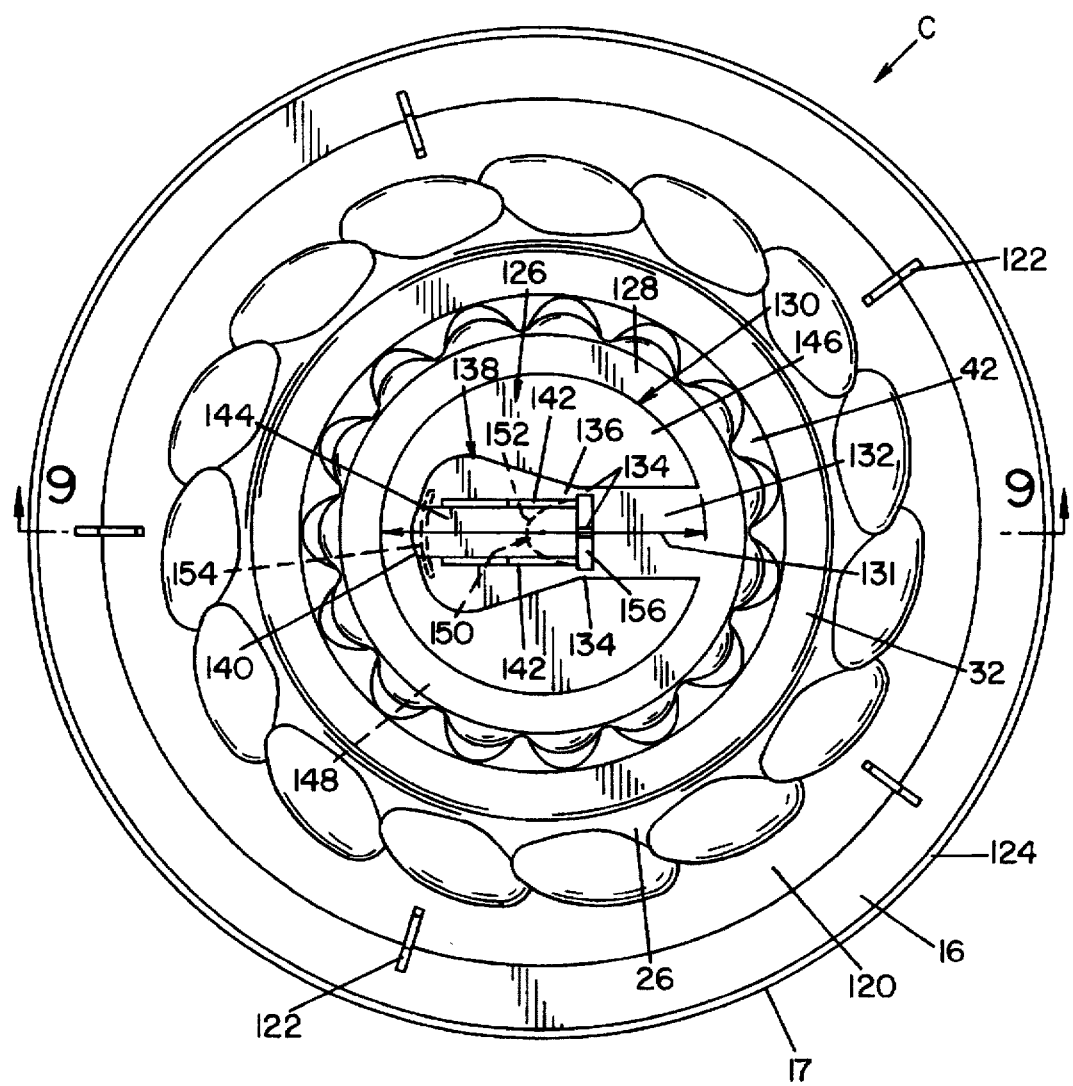
FIG. 8 is a top plan view of a third embodiment of the food container of the subject invention.
Figure 9:
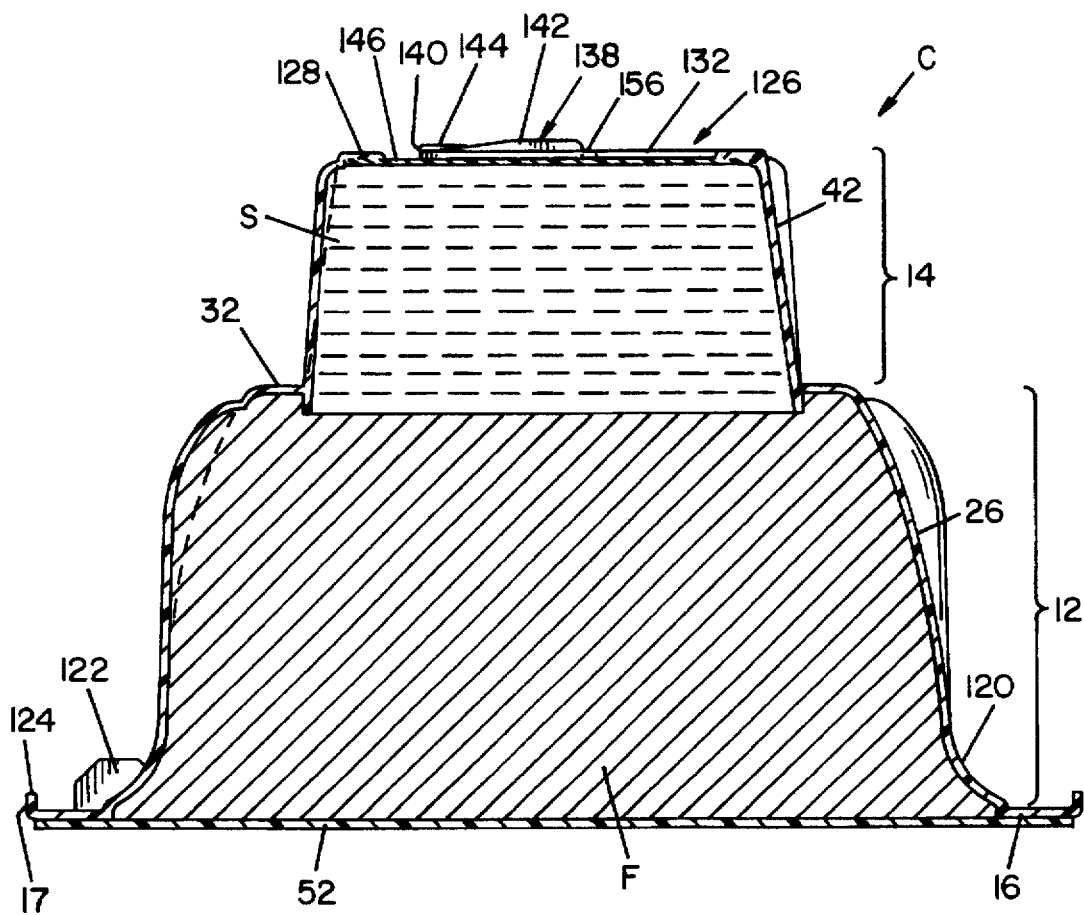
FIG. 9 is an elevational view in cross-section of the container shown in FIG. 8 taken along line 9—9 in FIG. 8.

A second preferred embodiment is shown in FIG. 7. The same reference numerals are used to designate structures corresponding to those found in the first preferred embodiment. In this embodiment, upper section 14 and lower section 12 are not necessarily relatively displacable as described above. Thus, the product is removed from the container in a manner different from that described above. An opening 100 is provided in container top 46 and a tab 102 is removably attached to top 46 to hermetically seal opening 100. A closure 52 is provided to hermetically seal the opening defined by bottom edge 18 of lower portion 12. To serve product F using the second preferred embodiment of the subject container, bottom closure 52 is removed from bottom 12 of lip 16 and the bottom 17 of container 10 is placed on plate 56. Tab 102 is then grasped by free end 104 and peeled away from top 46 thereby breaking the seal over opening 100. Sauce S is now exposed to the atmosphere surrounding container 10. Container 10 can now be lifted away from food product F because opening 100 allows air into upper portion 14 of container 10 to prevent the formation of a vacuum between sauce S and top 46. Sauce S is then free to flow over product F as heretofore described. It will be appreciated that as long as connecting wall 38 is located below top edge 30, sauce S will be confined to upper portion 14 during shipment and storage. Because product F and sauce S may be readily removed from container 10 when opening 100 is unsealed, it is no longer necessary that connecting wall 38 and flange 36 be flexible. Indeed, channel 54 need not be present in this embodiment.

In a third preferred embodiment, container C includes some minor structural differences. Specifically, side wall 26 of lower portion 12 includes an angled lower portion 120 that attaches to annular lip 16 instead of a stepped side wall portion 24. In addition, a plurality of reinforcing struts 122 extend perpendicularly between angled portion 120 and lip 16 to make lip 16 more rigid. The outer edge 17 of lip 16 is also bent upwardly to form a flange 124 which further increases the rigidity of the lip and container. Finally, in this embodiment, top wall 32 of lower portion 12 connects directly to sidewall 42 of upper portion 14, instead of to a series of connecting walls 36 and 38.

The top 126 of the container in this embodiment is substantially different from the tops of the containers of the previous two embodiments. Top 126 includes an annular periphery 128 surrounding an open central portion 130 having a diameter 131. A finger 132 extends radially inward from periphery 128 across approximately one third of the diameter 131 opening 130. Three ribs 134 extend radially from finger 132 and connect to a first end 136 of a tab 138. Tab 138 is also aligned with diameter 131 and spans about three quarters of the distance between finger 132 and periphery 128 opposite the attachment point of finger 132, terminating in a second tab end 140. Two parallel reinforcing ridges 142 extend between first end 136 and second end 140 and tab 138 includes a thickened central portion 144 therebetween. The ridges and thickened central portion stiffen tab 138 so that it can be used to open container C in a manner described hereafter.

Top 126 further includes a disc 146 having a diameter greater than diameter 131 and heat sealed to the underside of periphery 128 to form an annular first seal 148. Disc 146 is also heat sealed to the underside of finger 132 and the underside of tab 138 in an area 150 to form a first tab seal 152. Area 150 is located adjacent first tab end 136 and is about one quarter of the size of tab 136. An optional second tab seal 154 may be formed beneath second tab end 140 to hold tab 136 securely in place during packing and shipment.

This embodiment of container C is filled with a food product as has been heretofore described. To dispense the product, closure 52 is removed from lip 16 and the container is positioned with lip 16 on plate 56. If optional second tab seal 154 is present, it is broken at this time by the insertion of a user's fingernail or a spoon between tab 136 and disc 146 to release end 140. End 140 of tab 136 is then lifted away from disc 146 which stresses the region of disc 146 beneath first tab seal 152. The user continues to lift tab 136 until disc 146 ruptures beneath seal 152 to form an opening 153. Tab 126 is relatively inflexible due to the presence of ridges 142 and thickened central portion 144. Finger 132 is also relatively inflexible, being thicker than disc 146. Therefore, as tab 136 is pulled away from disc 146, it tends to pivot about the ribs 134 which serve as a hinge 156. Rupturing the container in this manner allows air into the container interior and prevents a vacuum from forming beneath disc 146 so that the container C can be lifted off of the food product F.

The invention has been described with reference to the preferred embodiment. Obviously, modifications and alterations will occur to others upon the reading and understanding of this specification. It is intended to include all such modifications insofar as they come within the scope of the appended claims or equivalents thereof.

Having thus described the invention, it is claimed:

1. A container for storing a food product, said food product comprising first and second distinct component, said container comprising: first lower and second upper compartments respectively for said first and second components, said second compartment including a top edge and a sidewall having a bottom edge; and sealing means for sealing said second component within said second compartment comprising said bottom edge and said first component.

2. The container of claim 1, wherein said first component is a solid and said second component is a liquid.

3. The container of claim 2, wherein said second compartment includes a bottom edge and wherein said sealing means includes said bottom edge.

4. The container of claim 3, wherein said first compartment includes a top wall and said bottom edge of said second compartment is spaced apart from said top wall.

5. The container of claim 4, wherein said second compartment completely overlies said first compartment.

6. The container of claim 1, including opening means for allowing air into said second compartment.

7. The container of claim 6, wherein said second compartment includes a top wall having hole therethrough and said opening means comprises a cover releasably sealed thereover.

8. The container of claim 6, wherein said opening means comprises tab means for creating an opening into said second compartment.

9. The container of claim 8, wherein said tab means is fixedly connected to said second compartment.

10. A container for storing a food product, said food product comprising first and second distinct component, said container comprising: a first lower compartment for said first component including a sidewall, a top edge and an inner edge extending inwardly and a second upper compartment including a top edge and a sidewall having a bottom edge extending outwardly connected to said inner edge of said first compartment; and sealing means for sealing said second component within said second compartment comprising said bottom edge and said first component.

11. The container of claim 10, including opening means for allowing air into said upper section.

12. The container of claim 11, wherein said opening means comprises tab means for breaking said upper section.

13. The container of claim 12, wherein said upper section includes a top wall and wherein said tab means is connected to said top wall.

14. The container of claim 13, wherein said top wall comprises an annular periphery and a circular disc sealed to said annular periphery.

15. The container of claim 14, wherein said upper section is cylindrical and said tab means extends radially from said annular periphery.

16. The container of claim 15, wherein said circular disc is sealed to said hinge means and a portion of said tab.

17. The container of claim 13, wherein said tab means comprises a first portion fixedly attached to said top wall and a second portion unattached to said top wall.

18. A container for storing a food product, said food product comprising a liquid portion and a solid portion, said container comprising: an upper section having a top wall and a sidewall including a bottom edge for storing said liquid portion and a lower section including a sidewall, a top edge and an inner edge connected to said bottom edge for storing said solid portion; sealing means comprising said solid portion and said bottom edge for sealing said liquid portion in said upper section; opening means for allowing air into said upper section comprising tab means connected to said top wall, said tab means comprising a first portion fixedly attached to said top wall and a second portion unattached to said top wall, said tab means including a tab and a hinge means for creating an axis of rotation for said tab.

19. The container of claim 18, wherein said hinge means includes a flexible portion and a rigid portion.

20. The container of claim 19, wherein said axis of rotation is located at said flexible portion.

21. The container of claim 20, wherein said tab includes reinforcing means.

22. The container of claim 21, wherein said reinforcing means comprises at least one upstanding ridge.

23. A container for storing a food product having a liquid portion and a solid portion, said container comprising a generally cylindrical lower compartment having a cross-section of a first diameter and an axis normal to said diameter, a generally cylindrical upper compartment having a cross-section of a second diameter and an axis normal to said diameter, said second diameter being shorter than said first diameter, and said compartments being coaxially connected, said lower compartment including a bottom opening and a top wall having an annular flange depending from said top wall, sealing means for sealing said liquid portion within said upper compartment comprising said solid portion and said flange, closure means releasably sealed over said bottom opening and opening means for allowing air into said upper compartment.

24. The container of claim 23, wherein said closure means includes an annular lip around said bottom opening.

25. The container of claim 24, wherein said closure means includes a closure releasably sealed to said lip.

26. The container of claim 25, wherein said lip includes a reinforcing flange normal to said lip and at least one reinforcing strut between said lip and said lower compartment.

27. The container of claim 23, wherein said annular flange has a third diameter and an axis normal to said diameter, and wherein said third diameter is equal to said second diameter, and said annular flange and said second compartment are coaxial.

28. The container of claim 23, wherein said upper compartment includes a top wall and said opening means comprises a tab, part of said tab being fixedly attached to said top wall whereby pulling on said tab breaks said top wall to allow air into said upper compartment.

29. A container for storing a food product having a liquid portion and a solid portion having a top wall, said container comprising a generally cylindrical lower section having a cross-section of a first diameter and an axis normal to said diameter, a generally cylindrical upper section having a cross-section of a second diameter and an axis normal to said diameter, said second diameter being shorter than said first diameter, and said sections being coaxially connected, said lower section including a bottom opening and a top wall having an annular flange depending from said top wall for forming a seal with said top wall of said solid portion, closure means releasably sealed over said bottom opening and including an annular lip having a reinforcing flange, and said top section including an annular periphery and tab means extending therefrom for allowing air into said upper section, and a circular disc sealed to said annular periphery and a portion of said tab means, whereby manipulating said tab means breaks a hole in said upper portion top wall.

* * * * *